US009151693B1

(12) United States Patent
Yang et al.

(10) Patent No.: US 9,151,693 B1
(45) Date of Patent: Oct. 6, 2015

(54) COMBINATORIAL TEST DEVICE

(75) Inventors: Wei Yang, Cupertino, CA (US); Patrick J. Tang, Fremont, CA (US); Zhuo Gao, Palo Alto, CA (US); Liu Zhongzhou, Shenzhen (CN); Ali-Reza Bahmandar, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 381 days.

(21) Appl. No.: 13/528,316

(22) Filed: Jun. 20, 2012

(51) Int. Cl.
*G01M 7/06* (2006.01)
*H04M 1/24* (2006.01)

(52) U.S. Cl.
CPC . *G01M 7/06* (2013.01); *H04M 1/24* (2013.01)

(58) Field of Classification Search
CPC .................................. G01M 7/06; H04M 1/24
USPC ............................. 73/865.3, 866.5; 455/67.11
See application file for complete search history.

(56) References Cited

U.S. PATENT DOCUMENTS

| 2002/0160717 | A1* | 10/2002 | Persson et al. ............... 455/67.1 |
| 2003/0159520 | A1* | 8/2003 | Canumalla ...................... 73/788 |
| 2006/0068713 | A1* | 3/2006 | Chang ........................ 455/67.11 |
| 2006/0156785 | A1* | 7/2006 | Mankame et al. ............... 72/413 |
| 2008/0129615 | A1* | 6/2008 | Breit et al. ...................... 343/703 |
| 2011/0029275 | A1* | 2/2011 | Kennedy et al. ............... 702/141 |
| 2012/0092034 | A1* | 4/2012 | Erdman et al. ........... 324/754.14 |

* cited by examiner

*Primary Examiner* — Hezron E Williams
*Assistant Examiner* — David Z Huang
(74) *Attorney, Agent, or Firm* — Sutherland Asbill & Brennan LLP

(57) ABSTRACT

A combinatorial test device is configurable to contemporaneously test one or more sensors of output devices free from user intervention. A device under test such as a user device is placed in a test fixture of the combinatorial test device. Under the control and monitoring of a test controller testing takes place. The testing may be performed for quality assurance after assembly or repair, or to determine the reliability of the device such as by testing the device until a particular life cycle value is reached or a component in the device fails.

20 Claims, 9 Drawing Sheets

COMBINATORIAL TEST DEVICE

BACKGROUND

Large numbers of user devices, such as electronic book ("e-Book") reader devices, desktop computers, portable computers, smartphones, tablet computers, and so forth, are manufactured or repaired every year. These user devices may incorporate a variety of input devices, output devices, or both input and output devices. Traditional test methods and devices have required significant manual intervention. For example, accelerometers in a user device may be tested after assembly by a human operator manually rotating the device. As a result, traditional testing introduces significant costs to manufacturing, increases production time, and may result in inadequate or insufficient testing.

Certain implementations will now be described more fully below with reference to the accompanying drawings, in which various implementations and/or aspects are shown. However, various aspects may be implemented in many different forms and should not be construed as limited to the implementations set forth herein. Like numbers refer to like elements throughout.

DETAILED DESCRIPTION

Large numbers of user devices, such as electronic book ("e-Book") reader devices, desktop computers, portable computers, smartphones, tablet computers, and so forth, undergo testing during manufacture or repair every year. These user devices may incorporate a variety of input devices, output devices, or both input and output devices.

Described in this disclosure are devices and methods for testing user devices. A combinatorial test device comprising an articulated test fixture and a stimulation fixture is coupled to a test controller. A device under test, such as a user device or a portion thereof, is mounted in the articulated test fixture. The articulated test fixture is configured to provide one or more degrees of freedom about which the device under test may be moved. During a stimulation sequence, the articulated test fixture may be configured to move the device under test in rotation, translation, or both. This movement may be configured to allow for testing of motion sensors internal to the device under test, such as accelerometers and gyroscopes.

The stimulation fixture comprises a plurality of stimulation sources configured to generate a response or signal in one or more of the sensors of the user device. The stimulation sources may include light sources, magnetic field sources, a force applicator or mechanical finger to impart a touch on a touch sensor or a button, a heat source, a sound source, a test pattern for imaging by a camera, and so forth. The stimulation fixture may also include sensors to detect output generated by the user device, allowing for testing of both input and output components of the user device.

The test controller may be in communication with the device under test to direct the device under test to perform various operations, such as acquiring and storing sensor data during a stimulation sequence. The test controller may retrieve the sensor data, analyze the data, and so forth. The test controller may be configured to vary the testing based at least in part on the sensor data retrieved from the user device during testing.

Illustrative System

Figure 1:
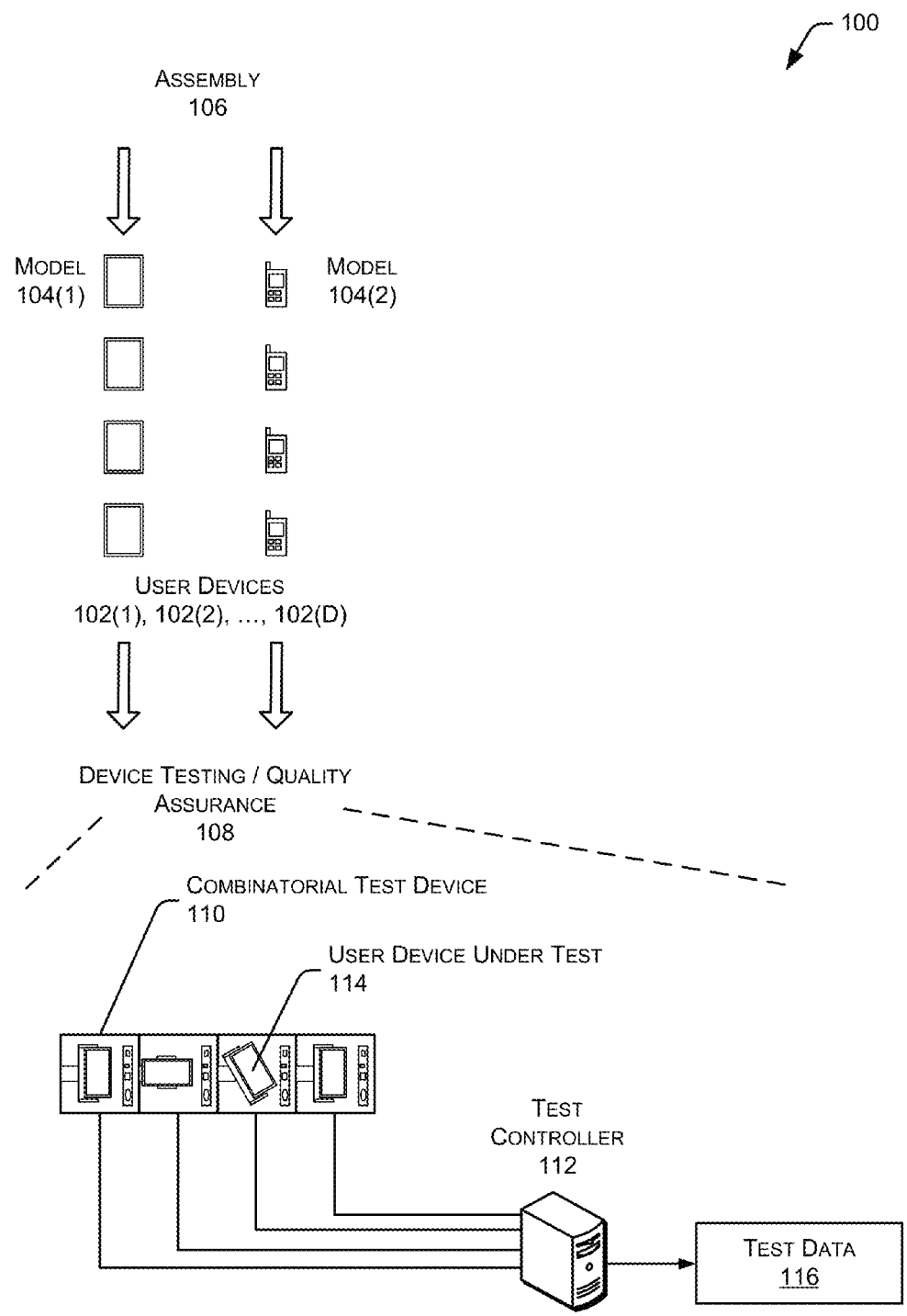
FIG. 1 illustrates a system including a combinatorial test device for testing a user device, or portion thereof, and generating test data in accordance with an embodiment of the disclosure.

FIG. 1 illustrates a system 100 including a combinatorial test device for testing a user device, or portion thereof and generating test data. One or more user devices 102(1), 102(2), . . . 102(D) are depicted. These may be complete or assembled user devices, or partially operational portions thereof. Partially operational portions are those which are sufficiently complete to allow for acquisition of data from one or more sensors and are able to output the data. For example, a partially complete user device 102 may comprise a main logic board having a plurality of motion sensors but may lack a display or battery. When external power is applied, the partially complete user device 102 generates data from the motion sensors. In some implementations, partially operational portions of non-user devices such as sub-assemblies of larger devices may also be tested as described herein.

The user devices 102 may have different form factors or physical configurations, such as a first model 104(1) which comprises a tablet computer as illustrated here and a second model 104(2) which comprises a smartphone. These models 104 are provided for illustration and not by way of limitation. These models 104 of the user devices 102 may undergo assembly 106 or repair, such as at a factory or maintenance facility. Once completed, or assembled to a partially operational state, the user devices 102 may undergo device testing, stress testing, or quality assurance 108. During this testing, the devices and methods described herein may be used.

A combinatorial test device 110 is configured to test a plurality of sensors in the user device 102 in an automated fashion, free from human intervention. The combinatorial test device 110 is coupled to a test controller 112. The test controller 112 is configured to communicatively couple to a user device under test 114 which is mounted in the combinatorial test device 110.

The test controller 112 may issue commands to, or retrieve data from, the device under test 114. The test controller 112 may also control the operation of the combinatorial test device 110 to produce stimulation sequences. A stimulation sequence contains instructions to select and activate particular actuators to move the device under test 114, activate stimulation sources, modulate the output of the stimulation sources, and so forth. The test controller 112 may use the data acquired from the sensors of the device under test 114, as well as sensors in the combinatorial test device 110 to assess the performance of the device under test 114 and generate test data 116. The test data 116 may comprise information about the pass/fail of particular components to particular stimulation sequences, information about the stimulation sequences applied to the device under test 114, analysis of one or more user devices 102 which have been tested, and so forth. The test data 116 may be based at least in part on sensor data, as well as other information gathered by the combinatorial test device 110. For example, information from strain gauges measuring coupling of the device under test to the device mount may be used to detect haptic output generated by the device under test 114.

The test controller 112 may be configured to perform one or more stimulation sequences configured to operate the sensors and output devices of the device under test 114. The test sequences may be configured to test the device to a particular threshold or until failure. By automating the testing process and providing the capability for contemporaneous testing of multiple sensors or output devices, accuracy and throughput are improved.

Figure 2:
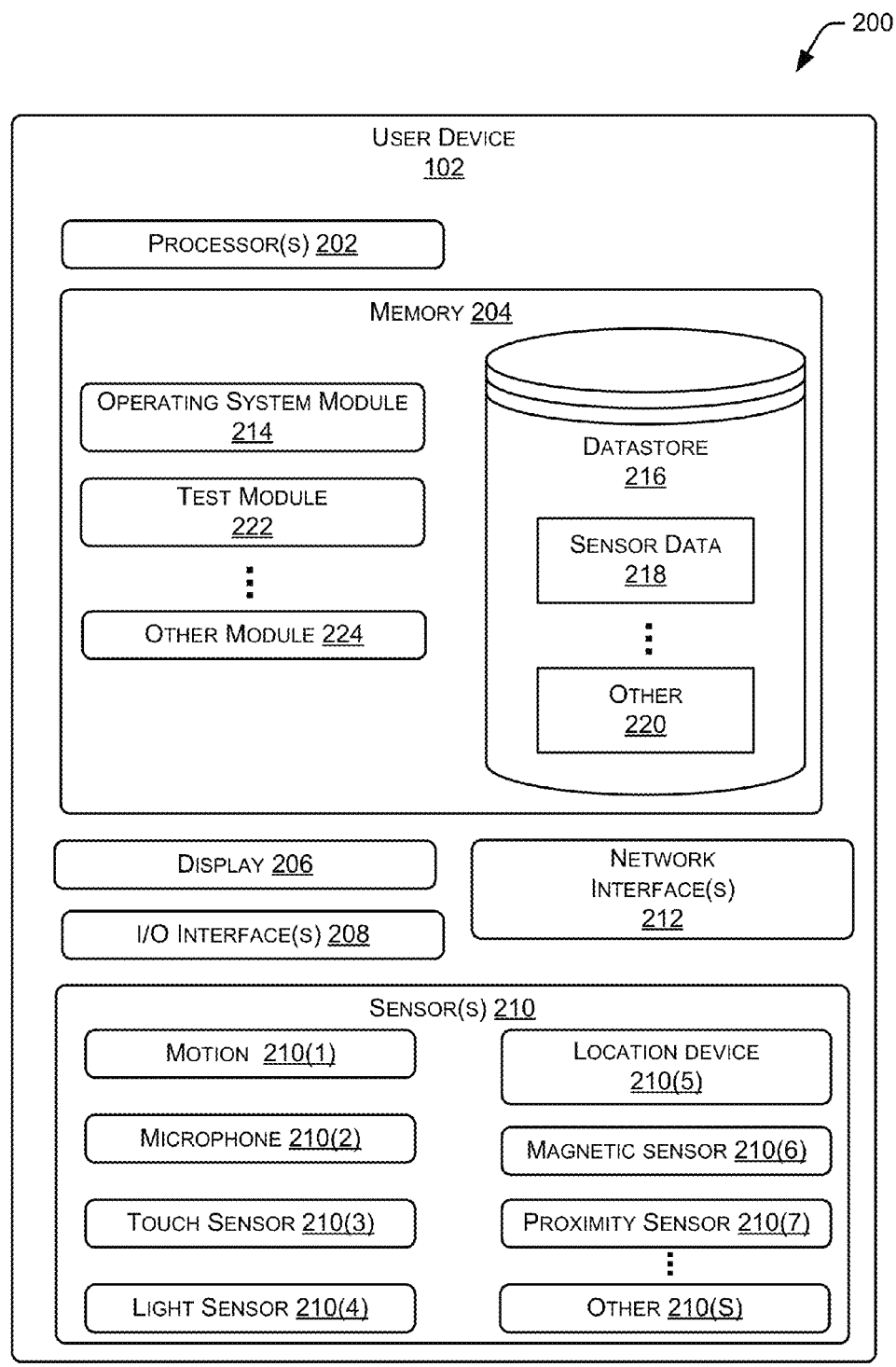
FIG. 2 illustrates a block diagram of the user device under test including sensors and output devices in accordance with an embodiment of the disclosure.

FIG. 2 illustrates a block diagram 200 of the user device 102 under test including sensors and output devices. The user device 102 may comprise one or more processors 202, one or more memories 204, one or more displays 206, one or more input/output ("I/O") interfaces 208, one or more sensors 210, and one or more network interfaces 212. The user device 102 may include other devices not depicted.

The processor 202 may comprise one or more cores and is configured to access and execute at least in part instructions stored in the one or more memories 204. The one or more memories 204 comprise one or more computer-readable storage media ("CRSM"). The one or more memories 204 may include, but are not limited to, random access memory ("RAM"), flash RAM, magnetic media, optical media, and so forth. The one or more memories 204 may be volatile in that information is retained while providing power or non-volatile in that information is retained without providing power.

The display 206 is configured to generate an image which is visible to a user. The image may be detected by a camera during testing. The display 206 may comprise a reflective or emissive display configured to present images to the user. An emissive display emits light to form an image. Emissive displays include, but are not limited to, backlit liquid crystal displays, plasma displays, cathode ray tubes, light emitting diodes, image projectors, and so forth. Reflective displays use incident light to form an image. This incident light may be provided by the sun, general illumination in the room, a reading light, and so forth. Reflective displays include, but are not limited to, electrophoretic displays, interferometric displays, cholesteric displays, and so forth. The display 206 may be configured to present images in monochrome, color, or both. In some implementations, the display 206 of the user device 102 may use emissive, reflective, or combination displays with emissive and reflective elements.

The one or more I/O interfaces 208 may also be provided in the user device 102. These I/O interfaces 208 allow for coupling devices such as keyboards, joysticks, touch sensors, cameras, microphones, speakers, haptic output devices, external memories, the test controller 112, and so forth to the user device 102.

The user device 102 may include one or more sensors 210. These sensors may include one or more motion sensors 210(1), microphones 210(2), touch sensors 210(3), light sensors 210(4), location devices 210(5), magnetic sensors 210(6), proximity sensors 210(7), and other sensors 210(S). The one or more motion sensors 210(1) may comprise one or more accelerometers, gyroscopes, and so forth configured to determine a change in motion of the user device 102. The motion sensors 210(1) may be configured to provide magnitude or scalar information, such as an acceleration of 3 meters per second per second (m/s$^2$), or vector information such as 3 m/s$^2$ along a particular axis of the user device 102.

The one or more microphones 210(2) may be configured to acquire sound information. For example, the one or more microphones 210(2) may acquire the sound of a user speaking.

The one or more touch sensors 210(3) are configured to determine the location and in some implementations, magnitude, of an incident touch. The one or more touch sensors 210(3) may comprise interpolating force sensing resistor arrays, capacitive sensors, optical touch sensors, and so forth.

The one or more light sensors 210(4) may provide data about ambient light levels in the environment of the user device 102.

The one or more location devices 210(5), such as global positioning system or other navigation or positional devices, may provide information such as a location of the user device 102, velocity of the user device 102, direction of travel of the user device 102, and so forth. This location information may be geographic location (or "geolocation") data such as a particular set of coordinates on the surface of the Earth, or may be a relative location such as "in the kitchen" or "at the office."

The one or more magnetic sensors 210(6) may be used to provide orientation of the device relative to the Earth, determine location of other devices incorporating magnets, and so forth. For example, the magnetic sensors 210(6) may be configured to detect a magnetic signal from a magnetic stylus used in conjunction with the touch sensor 210(3) of the user device 102. The magnetic sensors 210(6) may comprise Hall effect devices, microelectromechanical devices, and so forth.

The one or more proximity sensors 210(7) may provide an indication as to whether the user device 102 is proximate to another device or surface. The proximity sensors 210(7) may comprise capacitive, optical, or other devices. In some implementations, the proximity sensors 210(7) may be configured to provide information as to whether the proximate object is a user or an inanimate object such as a table.

Other sensors 210(S) may be present in or associated with the user device 102 to provide sensor data 218. For example, the other sensors 210(S) may comprise cameras, thermometers, radio frequency identification ("RFID") scanners, near-field communication devices, and so forth.

The one or more network interfaces 212 provide for the transfer of data between the user device 102 and another device directly such as in a peer-to-peer fashion, via a network, or both. The network interfaces 212 may include, but are not limited to, personal area networks ("PANs"), wired local area networks ("LANs"), wireless local area networks ("WLANs"), wireless wide area networks ("WWANs"), and so forth. The network interfaces 212 may utilize acoustic, radio frequency, optical, or other signals to exchange data between the user device 102 and another device such as the test controller 112, an access point, a host computer, another user device 102, and the like.

The one or more memories 204 may store instructions or modules for execution by the processor 202 to perform certain actions or functions. The following modules are included by way of illustration, and not as a limitation. Furthermore, while the modules are depicted as stored in the memory 204, in some implementations, these modules may be stored at least in part in external memory, such as in the test controller 112 which is accessible to the user device 102 via the network or the I/O interfaces 208. These modules may include an operating system module 214 configured to manage hardware resources such as the I/O interfaces 208 and provide various services to applications or modules executing on the processor 202.

The one or more memories 204 may also store a datastore 216. The datastore 216 may comprise one or more databases, files, linked lists, or other data structures. The datastore 216 may be configured to store at least a portion of sensor data 218, test sequence information, or other data 220.

A test module 222 is stored in the memory 204. The test module 222 is configured to acquire sensor data 218 from the one or more sensors 210 as well as other components in the device under test 114. The test module 222 may store the sensor data 218 in the datastore 216. The test module 222 may also establish communication with the test controller 112 and receive instructions from, or send the sensor data 218 to, the test controller 112.

In some implementations, the test module 222 may also be configured to generate output on the user device 102, such as via the display 206, speakers, haptic output devices, and so forth. The test module 222 may be provided to the user device 102 by the test controller 112. For example, the test controller 112 may establish communication with the operating system module 214 and transfer the test module 222 to the memory 204 of the device under test 114 for execution on the one or more processors 202.

Other modules 224 may be present in the memory 204 as well, such as virtual private networking modules, text-to-speech modules, speech recognition modules, and so forth.

Figure 3:
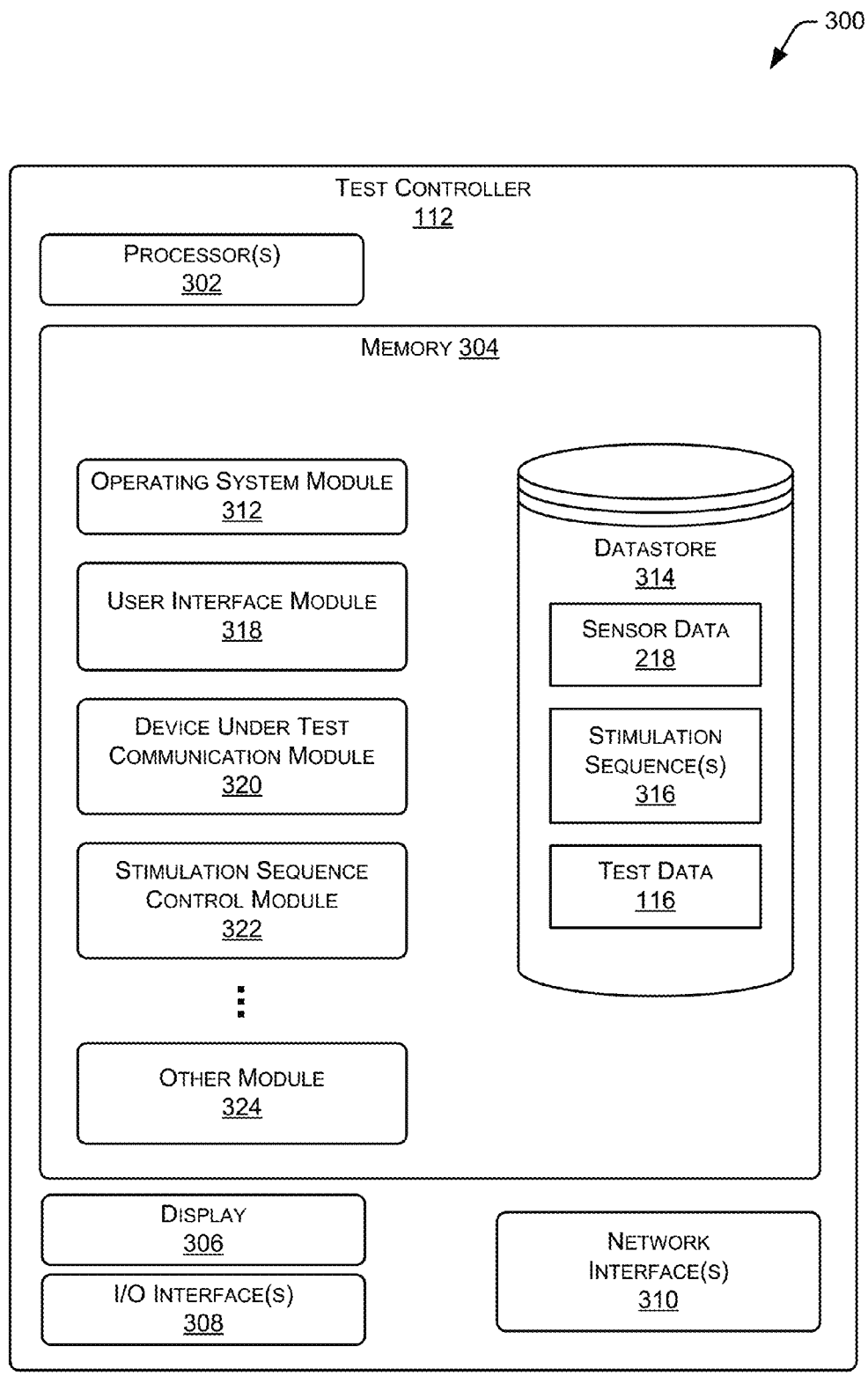
FIG. 3 illustrates a block diagram of a test controller in accordance with an embodiment of the disclosure.

FIG. 3 illustrates a block diagram 300 of the test controller 112. The test controller 112 may comprise one or more processors 302, one or more memories 304, one or more displays 306, one or more input/output ("I/O") interfaces 308, and one or more network interfaces 310. The memory 304 may store an operating system module 312 and a datastore 314. These components are similar to those described above with regard to FIG. 2. The modules and the functions described below are shown on a single test controller 112 for illustrative purposes and not by way of limitation. It is understood that the modules and the functions associated therewith may be provided by, or distributed across, one or more other test controllers 112, servers, or other devices.

The datastore 314 may store at least a portion of the sensor data 218 received from the user device 102. The datastore 314 may also store one or more stimulation sequences 316. The stimulation sequences 316 describe a series of stimuli to be presented to the device under test 114, such as particular sequences of motions, visible light to be applied at particular intensities, and so forth. The datastore 314 may also store the resulting test data 116.

A user interface module 318 is stored in the memory 304. The user interface module 318 may be configured to provide a user interface allowing an operator to initiate a test, configure the combinatorial test device 110, designate a stimulation sequence 316, and so forth.

A device under test communication module 320 is configured to establish communication with the device under test 114. The communication may occur before, after, or during execution of the stimulation sequence. The device under test communication module 320 may be configured to transfer the operating system module 214, the test module 222, and so forth to the device under test 114 such that the sensor data 218 may be acquired from the sensors 210 during the stimulation sequence.

A stimulation sequence control module 322 is configured to manage and execute one or more stimulation sequences 316. The stimulation sequence control module 322 may be configured to execute the stimulation sequences 316 such that the combinatorial test device 110 is directed to move the device under test 114 in a particular series of movements during testing, generate other stimuli, receive output from the device under test 114, and so forth.

Other modules 324 may be present in the memory 304 as well. These modules may provide functions such as inventory tracking, statistical analysis of test data 116, and so forth.

Figure 4:
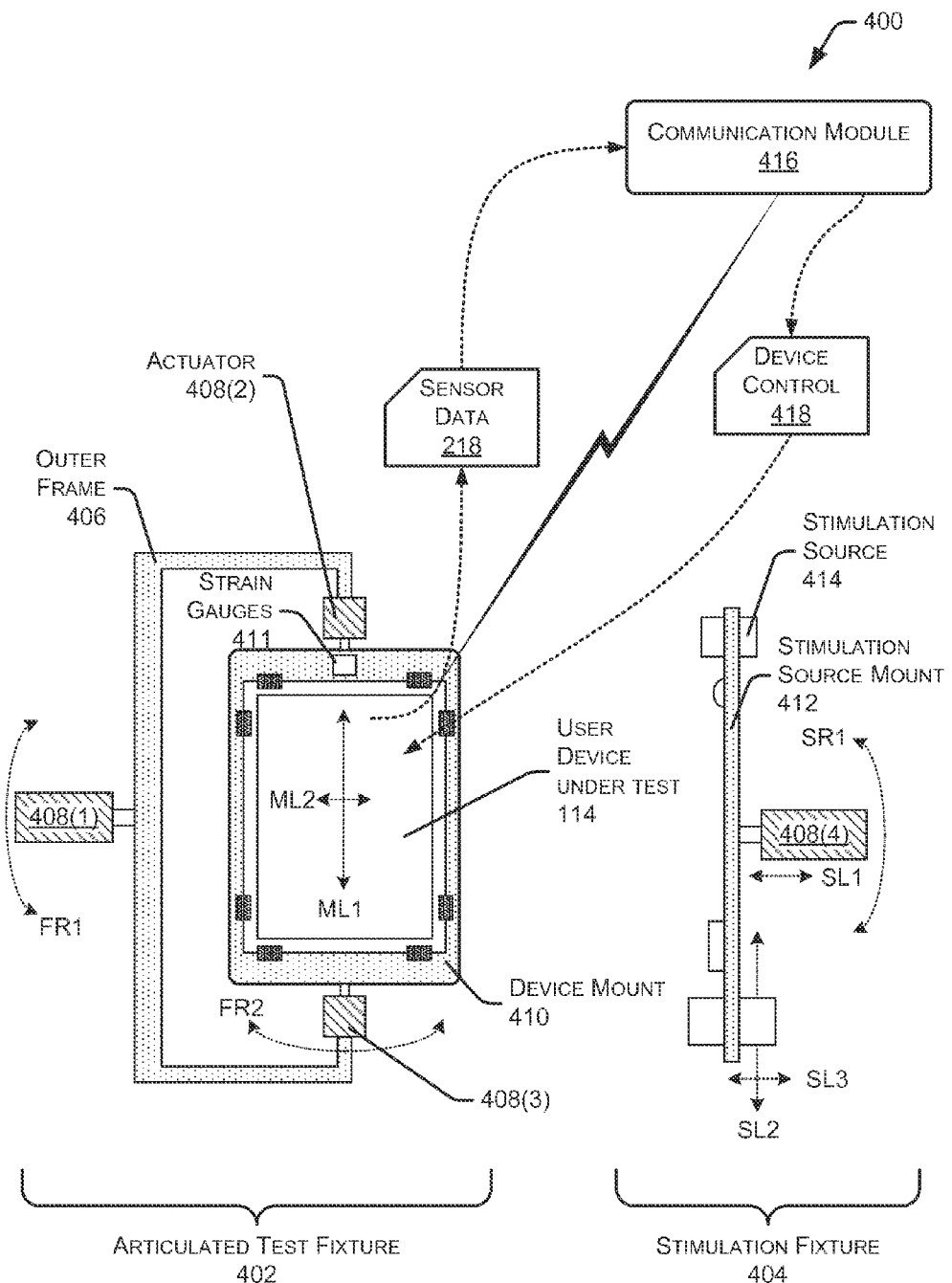
FIG. 4 illustrates an implementation of a combinatorial test device having an articulated test fixture and a stimulation fixture in accordance with an embodiment of the disclosure.

FIG. 4 illustrates an implementation 400 of a combinatorial test device 110. As shown in this illustration, the combinatorial test device 110 may comprise an articulated test fixture 402 proximate to a stimulation fixture 404. The articulated test fixture 402 is configured to hold and move the device under test 114 along one or more degrees of freedom. This motion may be rotational, translational, or a combination thereof. This movement may be provided to test one or more motion sensors onboard the device under test 114, align the device under test 114 with a particular stimulation source such as on the stimulation fixture 404, test mechanical construction of the device under test 114, and so forth. The stimulation fixture 404 is configured to emit stimuli to test sensors of the device under test 114, receive output from the device under test 114, or both.

The articulated test fixture 402 may comprise an outer frame 406 configured to couple to one or more actuators 408. The outer frame 406 is coupled to an outer actuator 408(1) configured to move the outer frame 406 in rotation as described by FR1. A device mount 410 is coupled to the outer frame 406 via mount actuators 408(2) and 408(3). These actuators may be configured to provide linear, rotational, or combination linear and rotational motion to the device mount 410 relative to the outer frame 406. The actuators 408(2) and 408(3) may be the same type of actuators or may be different. For example, the actuator 408(2) may comprise a linear actuator configured to displace the device mount 410 linearly in a plane of the device mount 410, such as indicated by arrows ML1 and ML2. Continuing the example, the actuator 408(3) may comprise a rotary motor configured to rotate in motion described by FR2 the device mount 410 along an axis perpendicular to the rotation FR1. In some implementations, the actuator 408 may comprise a plurality of actuators, such as an actuator configured to provide rotation as well as linear motion.

The device under test 114 is coupled to the device mount 410. As a result, movement of the device mount 410 results in movement of the device under test 114. The device mount 410 may provide mechanical mounting for the device under test 114 as well as electrical power, communications, and so forth. In some implementations, strain gauges 411 may be present in the device mount 410, such as part of a retention cage on the device mount 410 configured to hold the device under test 114. These strain gauges 411 may be used to detect haptic output generated by the device under test 114, confirm the device under test 114 is mounted properly during testing, and so forth.

As described above, proximate to the articulated test fixture 402 is the stimulation fixture 404. The stimulation fixture 404 comprises a stimulation source mount 412. The stimulation source mount 412 is coupled to one or more actuators 408. As shown here, the stimulation source mount 412 is coupled to a stimulation-source actuator 408(4) configured to provide rotary motion described by SR1 and linear motion towards and away from the articulated test fixture 402 as described by SL1.

Coupled to the stimulation source mount 412 are one or more stimulation sources 414. The stimulation sources 414 comprise devices configured to elicit a response from one or more of the sensors in the device under test 114. The stimulation sources 414 may be modular and utilize one or more standardized form factors such that during testing of different models 104 different stimulus sources may be used. Such modularity allows for easy replacement and customization of the combinatorial test device 110 for different models 104 of user devices 102 having different stimulation sequences.

The stimulation sources 414 may be configured to move relative to the stimulation source mount 412. As illustrated here, a stimulation source 414 may be configured to move radially along line SL2, relative to a center of the stimulation source mount 412. The stimulation source 414 may also be configured to move towards and away from the user device under test 114, such as along line SL3. During a stimulation sequence, the stimulation source mount 412 may be rotated or otherwise moved, stimulation sources 414 may be moved, and so forth to bring the stimulation sources to a pre-determined relative position with respect to corresponding sensors of the device under test 414. The stimulation fixture 404 is described below with regard to FIG. 5.

In another implementation such as described below with regard to FIG. 7, the stimulation fixture 404 may be fixed relative to the articulated test fixture 402. In this implementation, the device mount 410 may be moved to align the device under test 114 with particular portions of the stimulation source mount 412.

The combinatorial test device 110 may also comprise a communication module 416. The communication module 416 is configured to communicatively couple the test controller 112 to the device under test 114. The communication module 416 may comprise a wired connection, a wireless link, or a combination thereof. The communication module 416 is configured to provide device control 418 commands to the device under test 414. For example, the device control 418 may instruct the device to present a particular image on the display 206, play back a particular sound via the onboard speakers, and so forth.

The communication module 416 is also configured to receive the sensor data 218 or other information from the device under test 114. For example, the other data may include device status, device identification, processor utilization, battery status, and so forth. The communication module 416 is also described in more detail below with regard to FIG. 5.

The combinatorial test device 110 may also comprise environmental equipment configurable to expose the device under test 114 to various environmental conditions such as particular temperatures, humidity, simulated solar flux, and so forth. For example, a refrigeration unit may provide cold air to chill the device under test 114 during testing of the display 206.

Figure 5:
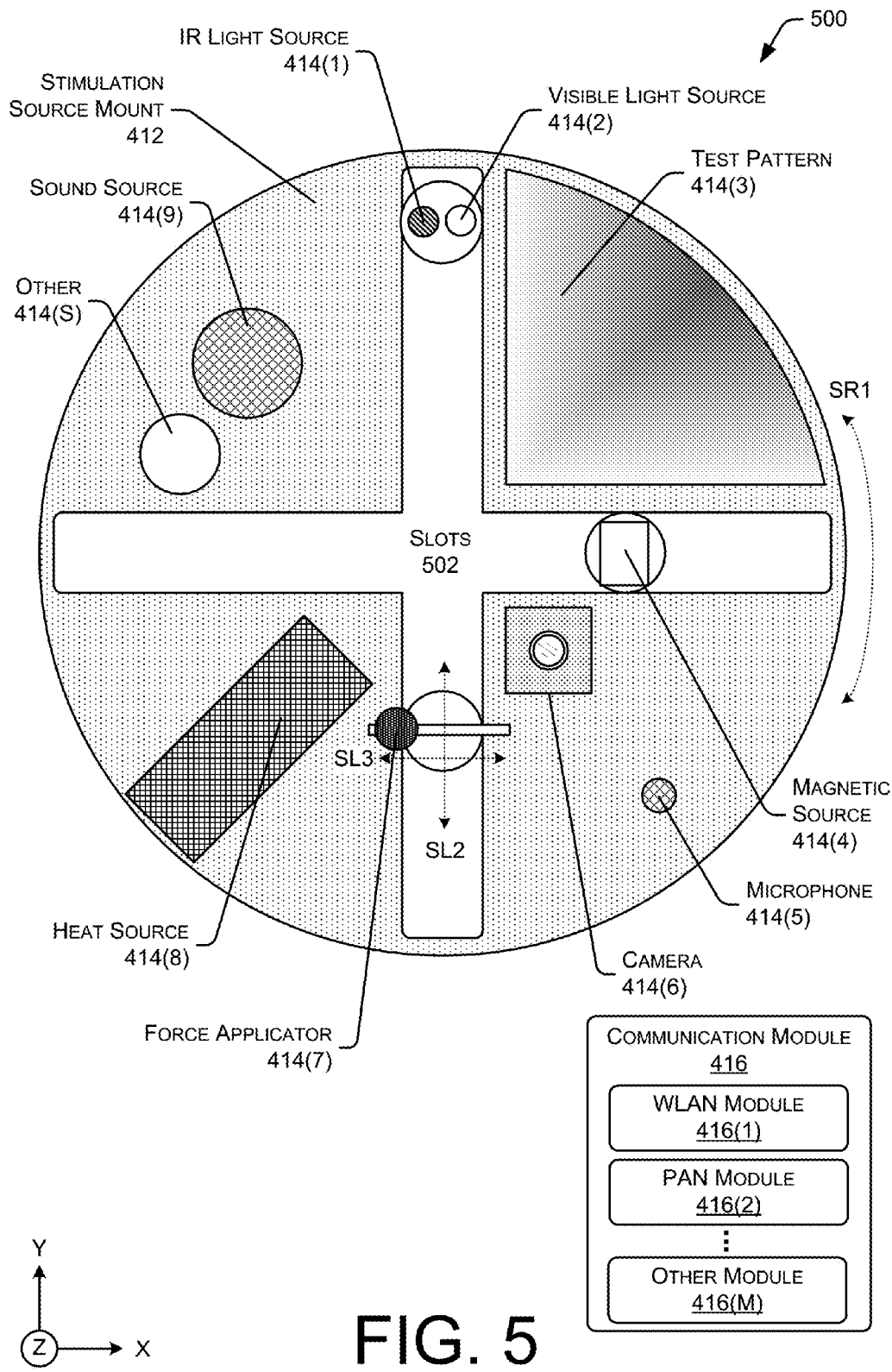
FIG. 5 illustrates a front view of the stimulation fixture of FIG. 4 in accordance with an embodiment of the disclosure.

FIG. 5 illustrates a front view 500 of the stimulation fixture 404 of FIG. 4. In this illustration the stimulation source mount 412 is depicted as being generally circular. In other implementations the stimulation source mount 412 may comprise other shapes, such as squares, rectangles, hexagons, octagons, and so forth.

The stimulation fixture 404 is configured to mount one or more stimulation sources 414. These stimulation sources 414 are configured to elicit a response or generate a signal on one or more sensors of the device under test 114. As described above, the stimulation sources 414 may be configured in a modular form factor. The stimulation source mount 412 may be configured with one or more slots 502 allowing for the movement of the stimulation sources 414 relative to the stimulation source mount 412. This movement may be provided via one or more actuators, such as to allow the repositioning of the stimulation source 414 during operation. In another implementation, the stimulation sources 414 may be manually moved, such as by an operator of the combinatorial test device 110 during setup.

These stimulation sources 414 may include an infrared ("IR") light source 414(1) configured to generate light which may be used by an ambient light sensor, proximity sensor, infrared receiver, and so forth. For example, the IR light source 414(1) may comprise one or more light-emitting diodes ("LEDs"). A visible light source 414(2) provides visible light to the device under test 114. For example, the visible light source 414(2) may also comprise an LED. This visible light source 414(2) may be used to test an ambient light sensor, to illuminate the display 206 during testing, and so forth. As shown here, the IR light source 414(1) and the visible light source 414(2) are mounted on a common housing configured to translate relative to the stimulation source mount 412. This translation may be configured to move the light sources to a pre-determined position during testing.

A test pattern 414(3) configured for imaging by a camera on the device under test 114 may be provided. This test pattern 414(3) may be preprinted, or may comprise an image presented by a display device such as an electrophoretic display, a liquid crystal display, and so forth.

A magnetic source 414(4) is configured to provide a magnetic field suitable for testing one or more of the magnetic sensors 210(6) of the device. The magnetic source 414(4) may comprise a permanent magnet. The permanent magnet may be configured to move such that the orientation of the generated magnetic field changes with respect to the device under test 114. In another implementation, the magnetic source 414(4) may comprise an electromagnet. The electromagnet may be configured to allow changes in polarity and variable field strength.

In some implementations, one or more sensors may be coupled to the stimulation fixture 404 to allow for testing output of the device under test 114. As shown here, a microphone 414(5) is depicted, configured to receive sound such as that generated by the speakers of the device under test 114. For example, the device under test 114 may be configured to present a particular set of sounds to test the operation of the speakers.

A camera 414(6) may be provided to acquire images of the device under test 114. These images may be used for several purposes including, but not limited to, identifying blemishes on the device, reading a machine-readable code such as a barcode on the device, acquiring a test pattern presented on the display 206, and so forth. For example, the test controller 112 may send via the communication module 416 a pre-determined test image to present on the display 206 of the user device under test 114. The camera 414(6) may acquire this image and compare the acquired image with a previously defined standard to determine when the display 206 is performing acceptably. The camera 414(6) may also be used to test uniformity of front- or back-lighting, for color calibration of the display 206, and so forth.

A force applicator 414(7) is depicted. The force applicator 414(7) is configured to translate radially inward and outward as indicated by SL2 and perpendicular to SL2 as indicated by SL3. The force applicator 414(7) is configured to apply a pressure or simulated touch to a particular point on the device under test 114. This applied pressure may be used to test operation of the touch sensor 210(3), one or more physical buttons, and so forth. In some implementations, a plurality of force applicators 414(7) may be used to allow for testing multi-finger gestures.

A heat source 414(8) may be provided to simulate radiators of thermal energy such as the sun, a user's body, and so forth. A sound source 414(9) such as a speaker is configured to generate an audible signal suitable for testing the one or more microphones 210(2) of the device under test 114.

Other stimulation sources or sensors 414(S) may also be present. For example, an infrared detector may be provided to receive infrared signals emitted by an infrared transmitter of the device under test 114. Other stimulation sources 414 may include a radio frequency identification ("RFID") transceiver to check one or more RFID tags located in the device under test 114. The stimulation sources 414 may also include an RFID tag for testing an RFID transceiver in the device under test 114.

The communication module 416 as described above is configured to couple the device under test 114 with the test controller 112. The communication module 416 may comprise a WLAN module 416(1), a PAN module 416(2), or other module 416(M) such as a wired serial communication module, WWAN module, and so forth. In some implementations, the communication module 416 may be configured to test the I/O interfaces 208, network interfaces 212, or both of the user device under test 114.

Figure 6:
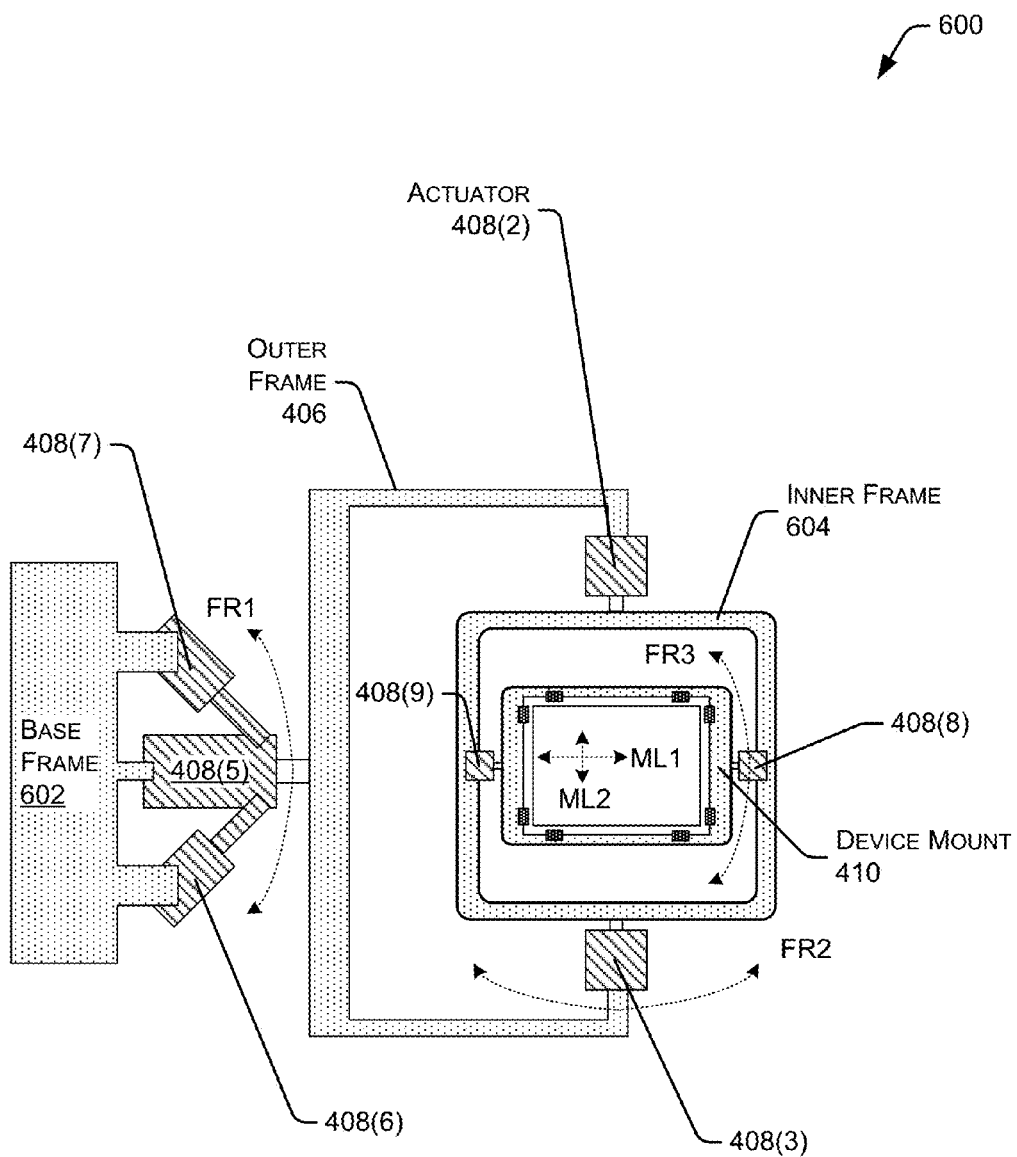
FIG. 6 illustrates another implementation of an articulated test fixture in accordance with an embodiment of the disclosure.

FIG. 6 illustrates another implementation 600 of an articulated test fixture. In this implementation, a base frame 602 is provided which is coupled to the outer frame 406 via the actuators 408(5), 408(6), and 408(7). These actuators 408(5)-408(7) are configured to rotate the outer frame 406 along FR1 and tilt the outer frame 406 relative to the base frame 602. Coupled to the outer frame 406 via the actuators 408(2) and 408(3) is an inner frame 604. The inner frame 604 may rotate as indicated by FR2 about an axis which is perpendicular to the axis of rotation of FR1.

Coupled to the inner frame 604 by the actuators 408(8) and 408(9) is the device mount 410. The device mount 410 may be configured to rotate as indicated by FR3 about an axis which is perpendicular to the axis of rotation of FR2. With this arrangement, the device mount 410 may be rolled, pitched, or yawed allowing for the testing of gyroscopes, accelerometers, or other motion sensing devices in the device under test 114.

The actuators 408 in the articulated test fixture 402 may be configured to provide linear, rotational, or combination linear and rotational motion to the device mount 410. For example, the actuators 408 may comprise linear actuators configured to displace the device mount 410 linearly in a plane. These motions may result in displacement of the device mount 410, such as indicated by ML1 and ML2.

Figure 7:
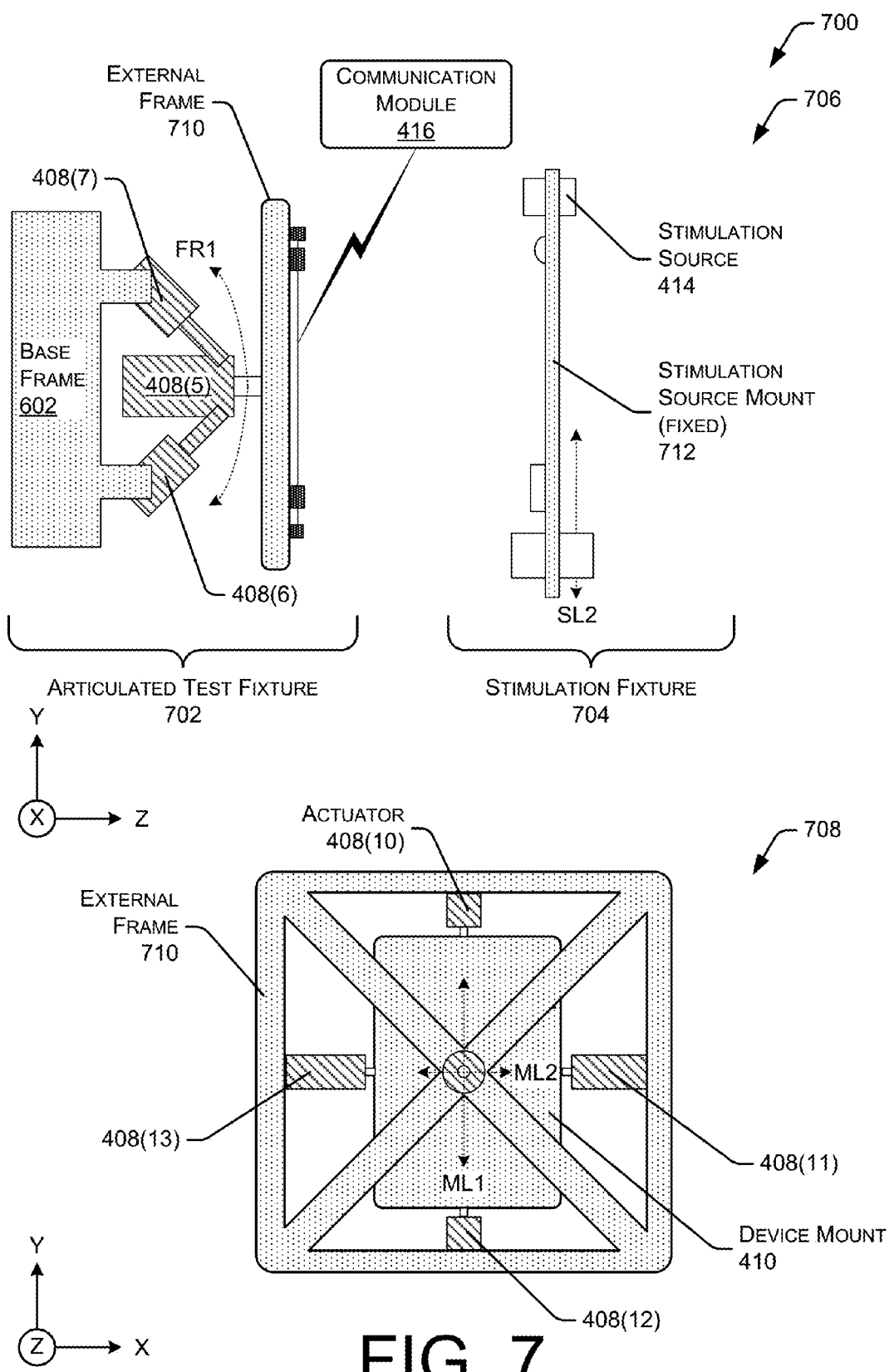
FIG. 7 illustrates another implementation of a combinatorial test device having an articulated test fixture and a stimulation fixture in accordance with an embodiment of the disclosure.

FIG. 7 illustrates another implementation 700 of the combinatorial test device 110 having an articulated test fixture 702 and a stimulation fixture 704. The articulated test fixture 702 and the stimulation fixture 704 are depicted with a side view 706, and the articulated test fixture 702 is depicted in an elevation view 708 looking along the Z axis.

The articulated test fixture 702 comprises the base frame 602 and actuators 408(5)-408(7) which are coupled to an external frame 710. The actuators 408(5)-408(7) are configured to rotate the external frame 710 in the motion described by FR1, as well as tilting the external frame 710 relative to the base frame 602. In some implementations, the actuators coupling the base frame 602 to the external frame 710 may be configured as a Stewart platform comprising a plurality of prismatic actuators.

Arranged proximate to the external frame 710 of the articulated test fixture 702 is the stimulation fixture 704. The stimulation fixture 704 comprises a stimulation source mount 712 which is fixed relative to the base frame 602. Coupled to the stimulation source mount 712 are one or more stimulation sources 414(1)-414(S). While the stimulation source mount 712 may be fixed, in some implementations one or more of the stimulation sources 414 may be configured to move relative to the stimulation source mount 712 such as described above with regard to FIG. 5. For example, the force applicator 414(7) may move linearly along the line SL2.

The elevation view 708 depicts the actuators 408(10)-408(13) coupling the device mount 410 to the external frame 710. These actuators 408(10)-408(13) may be linear actuators configured to move the device mount 410 as indicated by arrows ML1 and ML2. The linear actuators may be configured to apply translational motion, vibration, and so forth to the device mount 410.

Illustrative Processes

Figure 8:
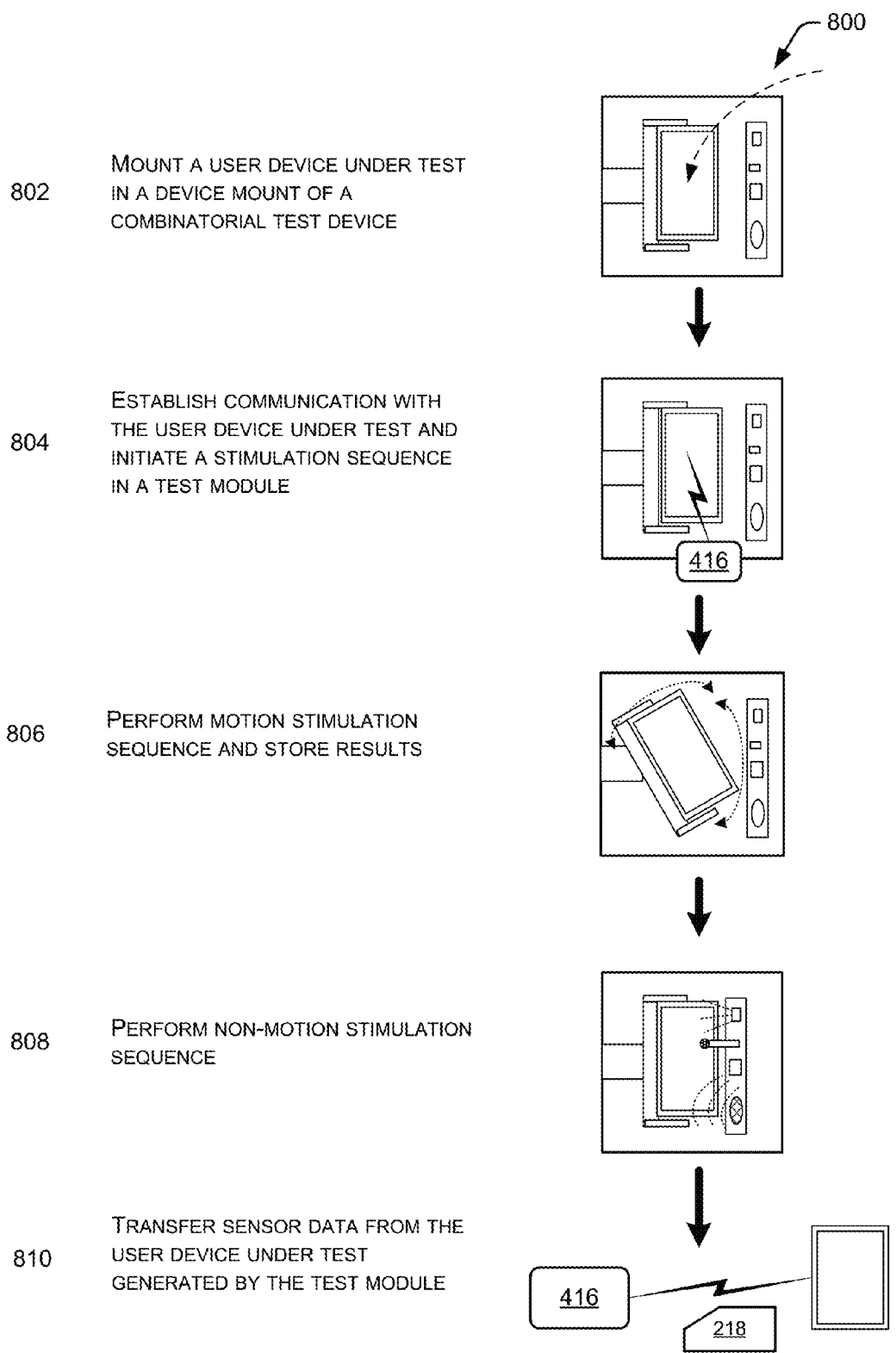
FIG. 8 illustrates a process of testing the user device using the combinatorial test device in accordance with an embodiment of the disclosure.

FIG. 8 illustrates a process 800 of testing the user device 102 using the combinatorial test device 110 as coupled to the test controller 112. At 802, a user device under test 114 is mounted in a combinatorial test device 110. For example, a robotic arm may load the user device 102 into the device mount 410. In another example, a human operator may load the user device 102. As depicted in FIG. 1, a plurality of combinatorial test devices 110 may be available for use, allowing for testing of a series of user devices 102.

At 804, communication is established between the user device under test 114 and the test controller 112, and a stimulation sequence is initiated by the test module 222. As described above, the communication may be provided at least in part by the communication module 416 in the combinatorial test device 110. The stimulation sequence initiation may trigger the test module 222 to begin acquiring sensor data 218 from the sensors 210 and generate output.

At 806, a motion stimulation sequence is performed, and the user device under test 114 stores the resulting sensor data 218. For example, the user device under test 114 may be spun to test operation of a gyroscope, linearly translated to test an accelerometer, and so forth.

At 808, a non-motion stimulation sequence is performed. For example, the force applicator 414(7) may apply several touches to the touch sensor 210(3). The motion stimulation sequence and the non-motion stimulation sequence may be performed contemporaneously. For example, during spinning of the user device under test 114, the microphone and speakers of the user device under test 114 may be tested, the network interfaces 212 may be checked, and so forth.

At 810, the sensor data 218 is transferred from the user device under test 114 via the communication module 416. As described above, the communication module 416 may establish communication using one of the I/O interfaces 208 or the network interfaces 212 of the user device under test 114. The test module 222 or the test controller 112 may initiate the transfer.

In one implementation, the sensors 210 and output devices of the user device under test 114 may be calibrated. Calibration data may be transferred from the test controller 112 to the user device under test 114 for later use. For example, known accelerations and rotations may be applied to the user device under test 114, and correction factors accounting for the particular motion sensors therein may be generated and provided to the user device under test 114.

Figure 9:
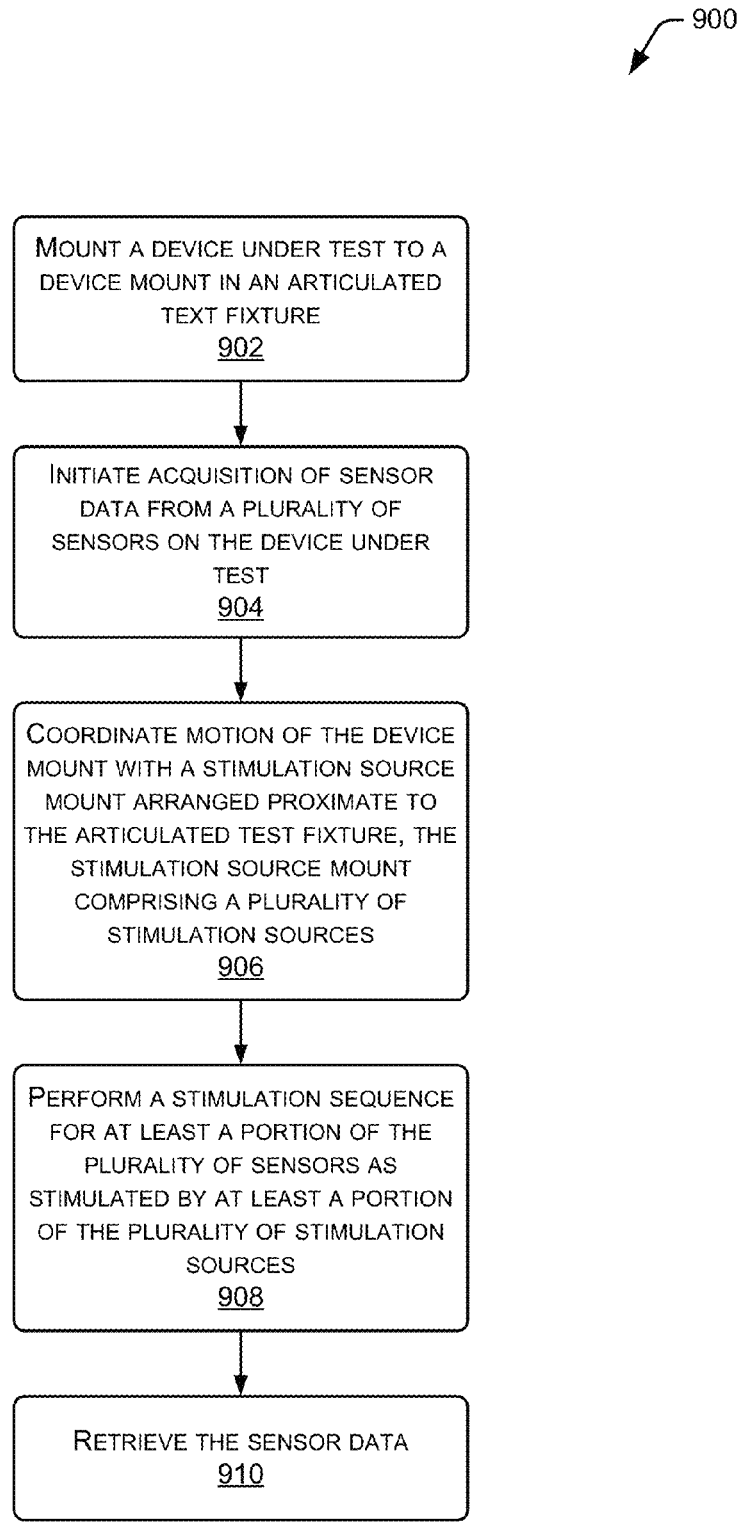
FIG. 9 illustrates a flow diagram of a process of testing a user device in accordance with an embodiment of the disclosure.

FIG. 9 illustrates a process 900 of testing the user device 102 with the combinatorial test device 110 described herein. Block 902 mounts a user device under test 114 to a device mount 410 in an articulated test fixture, such as 402 or 702 described above, configured to move the device mount 410 during testing. This mounting may comprise engagement of a retention mechanism such as a clip or a clamp to retain the device under test 114. The articulated test fixture is arranged proximate to a plurality of stimulation sources 414 coupled to a stimulation source mount, such as 412 or 712 described above.

Block 904 initiates acquisition of sensor data 218 from a plurality of sensors 210 on the user device under test 114. For example, the test module 222 may begin storing data from the sensors 210 and other information about the user device under test 114.

Where the stimulation fixture 404 is configured with a movable stimulation source mount 412, such as described above with respect to FIG. 4, block 906 coordinates motion of the stimulation source mount 412 with the device mount 410 during at least a portion of the stimulation sequence. For example, while rotating the user device under test 114 along rotation FR1, the stimulation source mount 412 and attached stimulation sources 414 may be synchronized to rotate in the same direction and at the same rate along SR1, allowing the user device under test 114 to appear stationary in relation to the stimulation sources 414 coupled to the stimulation source mount 412.

Block 908 performs a stimulation sequence for at least a portion of the plurality of sensors 210 on the user device under test 114. The stimulation sequence 316 comprises stimuli generated by at least a portion of the plurality of stimulation sources 414. The stimulation sequence 316 may comprise a plurality of differing motions imparted to the user device under test 114 through the rotation, translation, or rotation and translation of the articulated test fixtures 402, 702, and so forth. The sensor data 218 may comprise output from one or more motion sensors such as accelerometers, gyroscopes, and so forth.

The stimulation sequence 116 may also comprise initiating generation of output by one or more output devices of the user device under test 114 and detecting the output with one or more sensors in the combinatorial test device 110. For example, the display 206 of the user device under test 114 may be configured to present a test pattern which is imaged by the camera 414(6).

Block 910 retrieves the sensor data 218 from the user device under test 114. For example, the sensor data 218 may be retrieved via the communication module 416 and provided to the test controller 112. This transfer may use a wireless connection with the user device under test 114, such as provided by the WLAN module 416(1) or the PAN module 416(2). In some implementations, the sensor data 218 may be sent during the stimulation sequence.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, comprising:
   an articulated test fixture comprising:
   a frame mechanically coupled to one or more actuators such that the frame rotates upon activation of at least a portion of the one or more actuators;
   a device mount configured to hold a device under test, the device mount coupled to the frame via one or more mount actuators; and
   a stimulation fixture arranged opposite to the articulated test fixture, the stimulation fixture comprising:

a stimulation source mount coupled to one or more stimulation source actuators; and a plurality of sensor stimulation sources coupled to the stimulation source mount, at least one of the sensor stimulation sources configured to provide at least one stimulus to one or more sensors of the device under test; and a test controller configured to control the one or more mount actuators to rotate the device mount about an axis and to simultaneously control the one or more stimulation source actuators to rotate at least a portion of the stimulation source mount about the axis such that the device mount and the plurality of sensor stimulation sources coupled to the stimulation source mount simultaneously rotate about the axis.

2. The device of claim 1, wherein the axis is perpendicular to an axis of rotation of the frame.

3. The device of claim 1, the articulated test fixture further comprising one or more strain sensors configured to measure coupling of the device under test to the device mount.

4. The device of claim 1, further comprising one or more actuators configured to generate a linear motion of the device under test.

5. The device of claim 1, wherein the test controller is configured to activate one or more of the plurality of stimulation sources during a time period when the one or more mount actuators rotate the device mount about the axis and the one or more stimulation source actuators simultaneously rotate at least a portion of the stimulation source mount about the axis.

6. The device of claim 5, wherein the test controller is further configured to control the one or more mount actuators and the one or more stimulation source actuators to coordinate rotational motion of at least one of the plurality of stimulation sensors and the device mount such that at least one of the plurality of stimulation sensors maintains its relative position to at least a portion of the device under test as the at least one of the plurality of stimulation sensors and the device under test rotate.

7. The device of claim 5, wherein the test controller is further configured to receive information indicative of a response of one or more sensors to stimulus provided by the one or more stimulation sources.

8. The device of claim 5, the sensor stimulation sources comprising two or more of an infrared light source, a visible light source, a magnetic field source, a force applicator, a heat source, a sound source, or a test pattern.

9. A device, comprising:
an articulated test fixture comprising:
a frame mechanically coupled to one or more actuators such that the frame is configured to move upon activation of at least a portion of the one or more actuators;
a device mount configured to hold a device under test, the device mount coupled to the frame; and
a stimulation fixture arranged opposite to the articulated test fixture, the stimulation fixture comprising:
a stimulation source mount coupled to one or more stimulation source actuators; and
a plurality of sensor stimulation sources coupled to the stimulation source mount, at least one of the sensor stimulation sources configured to provide at least one stimulus to one or more sensors of the device under test; and
a test controller configured to control the one or more stimulation source actuators to rotate at least a portion of the stimulation source mount about an axis such that the plurality of sensor stimulation sources coupled to the stimulation source mount rotate about the axis.

10. The device of claim 9, wherein the test controller is configured to control the one or more actuators of the articulated test fixture to move the device under test in a manner sufficient to generate a signal in one or more motion sensors of the device under test, the motion sensors comprising at least one of an accelerometer or a gyroscope.

11. The device of claim 9, further comprising a communication interface configured to receive information indicative of a response of one or more sensors to stimulus provided by the one or more stimulation sources.

12. The device of claim 9, the stimulation fixture further comprising one or more of a microphone, a camera, or an infrared detector configured to respond to a stimulus provided by the device under test.

13. The device of claim 9, wherein the test controller is configured to control the one or more actuators of the articulated test fixture and the one or more stimulation source actuators to rotate the stimulation fixture synchronously with the device mount such that at least one of the plurality of stimulation sensors maintains its relative position to the device under test as the at least one of the plurality of stimulation sensors and the device under test rotates.

14. The device of claim 9, further comprising a test controller configured to control the articulated test fixture and the stimulation fixture to perform one or more tests on the device under test.

15. The device of claim 14, wherein the test controller is further configured to retrieve sensor data from the device under test.

16. A method comprising:
initiating acquisition of sensor data from a plurality of sensors on a device under test mounted in a device mount of an articulated test fixture, wherein the articulated test fixture is positioned opposite a plurality of stimulation sources coupled to a stimulation source mount;
causing simultaneous rotation of the device mount and at least a portion of the stimulation source mount about an axis such that the device mount and the plurality of sensor stimulation sources coupled to the stimulation source mount rotate about the axis;
performing a stimulation sequence for at least a portion of the plurality of sensors on the device under test as stimulated by at least a portion of the plurality of stimulation sources; and
retrieving the sensor data from the device under test.

17. The method of claim 16, further comprising causing rotation of the device mount to rotate the device under test, wherein causing simultaneous rotation of the device mount and at least a portion of the stimulation source mount comprises coordinating rotational motion of the stimulation source mount with rotational motion of the device mount during at least a portion of the stimulation sequence such that the device under test rotates and at least one of the plurality of stimulation sensors maintains its relative position to the device under test as the device under test rotates.

18. The method of claim 16, wherein the stimulation sequence comprises a plurality of differing motions imparted to the device under test and the sensor data comprising output from one or more of an accelerometer or gyroscope.

19. The method of claim 16, wherein retrieving the sensor data comprises transferring the sensor data via a wireless connection with the device under test.

20. The method of claim 16, wherein the stimulation sequence comprises initiating generation of output by one or more output devices of the device under test and detecting the output with one or more sensors.

* * * * *